(No Model.)
L. G. FATH.
COMBINATION LADDER AND COT.
No. 580,826. Patented Apr. 13, 1897.
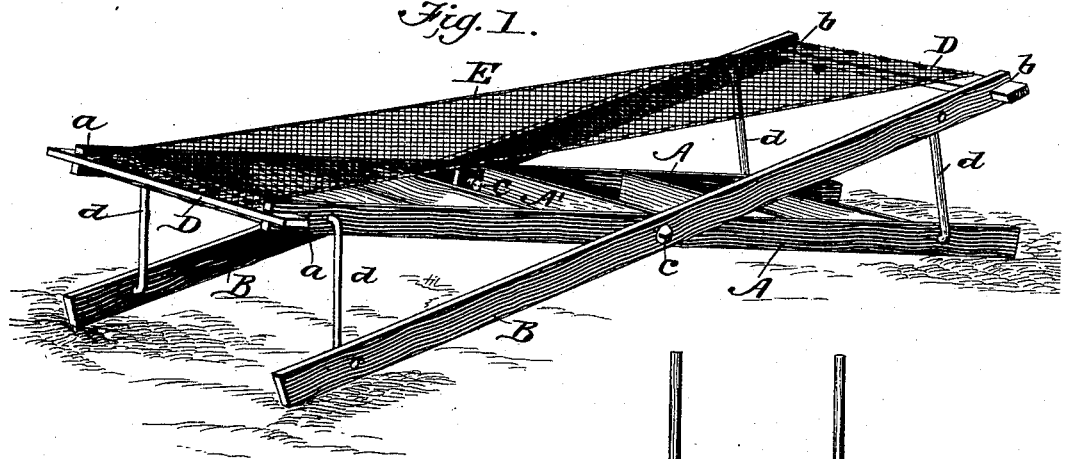
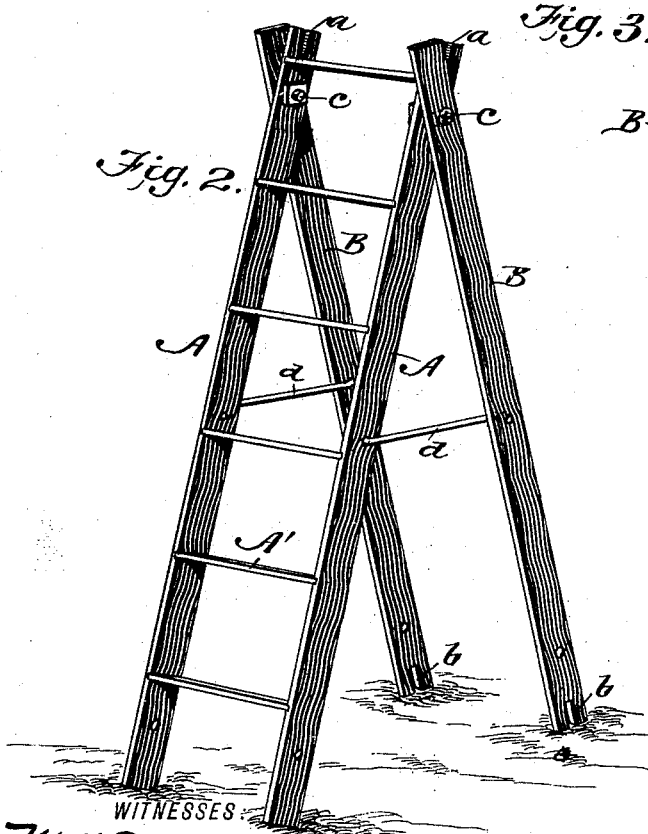
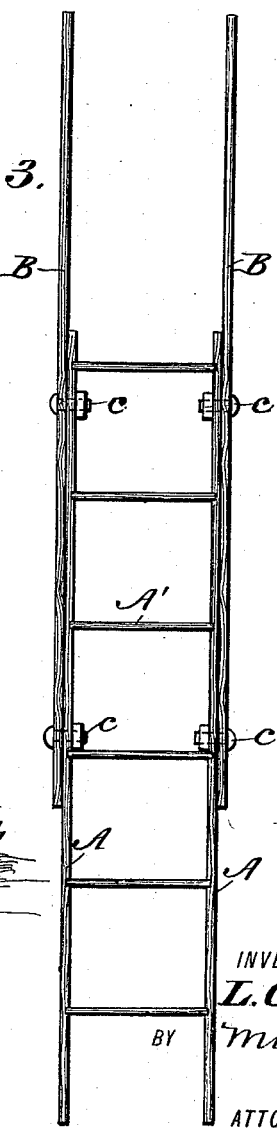
WITNESSES:
M. S. Blondel
Edw. W. Byrn
INVENTOR
L. G. Fath.
BY Munn & Co.
ATTORNEYS.
THE NORRIS PETERS CO., PHOTO-LITHO., WASHINGTON, D. C.

UNITED STATES PATENT OFFICE.

LEONARD G. FATH, OF SPRINGFIELD, MISSOURI.

COMBINATION LADDER AND COT.

SPECIFICATION forming part of Letters Patent No. 580,826, dated April 13, 1897.

Application filed July 16, 1896. Serial No. 599,423. (No model.)

*To all whom it may concern:*

Be it known that I, LEONARD G. FATH, of Springfield, in the county of Greene and State of Missouri, have invented a new and useful Combination Ladder and Cot, of which the following is a specification.

My invention is in the nature of a novel and convenient device to be used by slight adjustment either as a cot, a step-ladder, or an extension-ladder; and it consists in the peculiar construction and arrangement of parts, which I will now proceed to describe with reference to the drawings, in which—

Figure 1 is a perspective view of the device disposed as a cot. Fig. 2 is a perspective view of the frame parts arranged as a step-ladder, and Fig. 3 is a side view of the same arranged as an extension-ladder.

The device is made of two principal parts, a step-ladder portion A A A' and a pair of parallel bars B B. The step-ladder portion has two side pieces A A, preferably parallel and connected by cross-boards A', forming steps. One end of the side pieces A A are provided with notches or mortises $a\ a$, and the opposite ends of the parallel bars B B are provided with similar notches or mortises $b\ b$. Both the side pieces A A of the ladder-section and the parallel bars B B have three pivot-holes, one near the middle and one near each end. When adjusted as a cot, as shown in Fig. 1, the middle holes receive short pivot-bolts $c\ c$, that connect the two main parts together in the middle, while link-rods $d$ with cranked or right-angular-bent ends connect the end holes of the two sections to form braces.

When disposed as a cot, as in Fig. 1, the two members cross each other in a position approximating a horizontal plane with the two lower ends of the ladder-section and the two lower ends of the parallel bars resting upon the floor or ground as supporting-legs, while the two upper ends having the notches or mortises $a\ b$ sustain and distend the flexible bottom E, forming the cot. This flexible bottom may be of woven wire, canvas, knitted fabric, leather, or any other like material, and it is at each end attached to cross-bars D D, which are seated in the notches or mortises $a\ b$ of the framework, and are firmly held therein by the tension of any weight upon the cot-surface, which causes all the parts of the frame to act as a truss of great strength and rigidity.

When used as a step-ladder, the cot-surface E and its end pieces are discarded, the middle pivot-bolts $c$ are placed in the end holes of the two main parts, and one pair of the link-braces $d$ are adjusted in the middle holes of the two main parts, as shown in Fig. 2.

When the device is to be used as an extension-ladder, as in Fig. 3, the parallel bars are placed outside of and parallel with the step-ladder section, with the end holes of one section coinciding with the middle holes of the other section, and in this position they are rigidly clamped together by two pairs of short bolts $c$. When so adjusted, the device may be used as an extension-ladder, a painter's scaffold, and for various other uses.

Having thus described my invention, what I claim as new, and desire to secure by Letters Patent, is—

1. The step-ladder section made of two side pieces with cross-pieces or steps, combined with a pair of parallel bars, forming two main parts, each of which is provided with holes in the middle and holes near each end, and bolts and braces for connecting them substantially as and for the purpose described.

2. The step-ladder section made of two side pieces with cross-pieces or steps, combined with a pair of parallel bars, said bars and side pieces being notched or mortised at one end and provided with holes in the middle and at each end, bolts connecting the middle portions, link-braces connecting the end portions, and a cot-surface with end bars seated in the mortises of the two main parts substantially as and for the purpose described.

LEONARD G. FATH.

Witnesses:
SAML. P. APPLEBY,
G. W. RUTHERFORD.